Dec. 12, 1967     G. ZIEGLER     3,357,852
PROCESS OF PRODUCING MONOCRYSTALLINE LAYERS OF INDIUM ANTIMONIDE
Filed Dec. 2, 1963
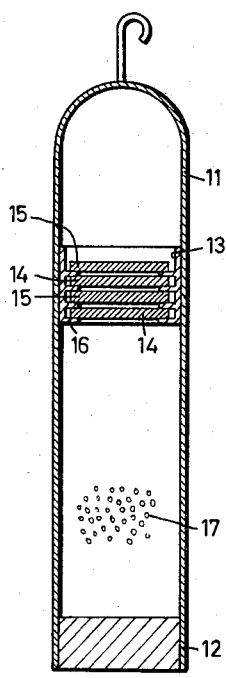

3,357,852
PROCESS OF PRODUCING MONOCRYSTALLINE LAYERS OF INDIUM ANTIMONIDE
Günther Ziegler, Erlangen, Germany, assignor to Siemens-Schuckertwerke Aktiengesellschaft, Berlin-Siemensstadt, Germany, a corporation of Germany
Filed Dec. 2, 1963, Ser. No. 327,471
Claims priority, application Germany, Dec. 1, 1962, S 82,678
10 Claims. (Cl. 117—106)

My invention relates to a process of producing monocrystalline layers of indium antimonide on substrates of crystalline material having the same or similar lattice structure.

The process of producing a germanium layer on a body of germanium accomplished by passing germanium halogenide in gaseous form over a substrate in a processing chamber which, together with its content, is heated to effect thermal dissociation of the halogenide has been shown. German Patent 865,160 is pertinent in this regard. According to the known method, germanium iodide is produced by passing hydrogen over heated iodine and subsequently passing evolved iodine hydride over a quantity of germanium, maintaining the chamber temperature near the germanium at 410 to 460° C. The resulting germanium iodide is thereafter thermally dissociated upon heated germanium bodies, thus precipitating an epitaxial layer of germanium upon these bodies.

A method of producing pure silicon is known in which silicon is volatilized in the presence of silicon halogenides. According to this method, purified silicon is volatilized in the presence of silicon-halogenides at a temperature of about 1000 to 1300° C. and is precipitated at a lower temperature in pure silicon form. The silicon halogenide can be produced directly in the reactor from silicon and halogen. If desired, the silicon halogenide vapor at the proper pressure is passed through a circulatory system, preferably employing a gaseous carrier or diluent.

In contrast to the production of monocrystalline layers of germanium and silicon, the production of monocrystalline layers comprising indium antimonide is more difficult due to the low melting point of indium antimonide. The growth of precipitating crystalline layers takes place below the melting point. For this reason, the vapor pressure of antimony at the operating temperature is very low, amounting to about $10^{-5}$ Torr (mm. Hg). Indium as well as antimony must be transferred to the substrate by transport reaction or segregation reaction. These reactions must be similar and sufficient to accommodate both indium and antimony. Furthermore, when operating in a sealed processing system, the transporting medium must become uniformly distributed with regard to both constituents. Since the transport or precipitation rates are never exactly equal so as to produce stoichiometrical indium antimonide, the one element that is being transported in excess above stoichiometry must become segregated and precipitated only in amounts required for stoichiometry. That is, the bonding energy must constitute a preponderant factor in the process. Bonding energy for indium antimonide, however, is extremely low, and for this reason, segregation must take place very close to equilibrium conditions.

It is an object of my invention to obtain a satisfactory and economical method for producing indium antimonide layers on substrate having the same or a similar (compatible) crystalline lattice constitution, thereby overcoming the various difficulties and meeting the extremely exacting requirements mentioned above.

To this end, and in accordance with my invention, monocrystalline layers of indium antimonide are produced by precipitation from gaseous halogenides of indium and antimony upon a substrate of compatible lattice structure by transport and segregation reaction in a sealed reaction vessel, under the conditions to be set forth. One or more stacks of chambers are set up in the reaction vessel, each chamber comprising a plate, such as a disc or wafer, of indium antimonide, which is to constitute a source of the substance to be precipitated; and each chamber is also to be bordered by a plate of the above-mentioned substrate material that is to receive the precipitated layer. The interspace between the two plates of respectively different materials, that forms an individual chamber, is to be 0.1 to 2 mm. Aside from the above-mentioned stack of different plates, I provide the reaction vessel with a halogen substance and also with a supply of coarsely granular indium antimonide, the grandules being located within the vessel but outside of the chamber-forming stack or stacks. The halogen serves to subsequently produce a halogenide for the purpose of maintaining the transport and segregation reaction in the above-mentioned chambers, and the composition of the reaction gas is preserved during the process by the presence of the granular antimonide.

The vessel, thus prepared and sealed, is thereafter heated to the transport-reaction temperature but in such manner that the temperature decreases from one axial end of the stack of plates toward the other at a gradient of 5 to 20° C. per cm., the direction of the gradient being such that each of the antimonide source plates is at a higher temperature than the substrate plate adjacent to the same chamber. Such a gradient is produced and maintained, for example, by placing the reaction vessel into a tubular furnace having a maximum temperature at the middle of the tubular furnace space and a lower temperature near the opening of the furnace space. Thus by placing the vessel in the proper position, the desired temperature distribution and gradient are obtained by accordingly controlling the heat supply. As a result, the substrate plates are individually coated with indium antimonide which precipitates in each chamber from the gaseous halogenides of indium and antimony. The temperature range employed for this purpose is preferably between about 400 and about 520° C.

The equilibrium within the chambers of a stack must not be disturbed by diffusion of substances into and out of the plates. Hence, the chambers must be relatively tight. The granular indium antimonide, located outside the chambers, acts as a buffer material and serves to prevent disproportionation at the surface of the indium antimonide plates during the starting-up period. For example, if one attempted to have the halogen react only with the plates, antimony would be dissolved preferentially out of the source plates; and this is prevented by the presence of granular indium antimonide within the gaseous atmosphere.

The spacing between the discs must be rather small because the rate of transfer would be too low if the distance between source plate and substrate were too large. The above-mentioned distance of 0.1 to 2 mm. has been found to reliably secure the desired results.

The temperature gradient should not be below or above the above-stated range because the rate of crystalline growth is undesirably low when the temperature gradient is too small, whereas equilibrium is no longer maintained if the temperature gradient is too large.

At temperatures near the lower limit, the difficulty encountered is that the applicable halogenides have low vapor pressures. While bromine and chlorine are also suitable, iodine has been found preferable as a transporting agent. To prevent undesired condensation of the halogenides, the halogenide pressure should stay below the critical value at which condensation occurs. For iodine this critical value corresponds to a concentration of about 0.6 mg./cm.$^3$ iodine. Any desired lower concentration, preferably not less than about 0.1 mg./cm.³ can be chosen. Suitable as substrate bodies are, for example, discs of indium antimonide, aluminium antimonide, cadmium telluride, barium fluoride.

To prevent undesired oxidation phenomena it is desirable to perform the process of the invention in a reducing atmosphere, for example in hydrogen-atmosphere.

The invention will be further described with reference to the accompanying drawing showing schematically and in section a processing vessel for performing the method.

A tubular reaction vessel 11 of quartz is closed at its lower end by a large stopper 12 of quartz. Mounted in the vessel is a stack 13 which in this embodiment is shown to comprise two individual transport-reaction chambers, each being formed by an interspace between a circular disc 14 of indium antimonide to serve as a source, and a circular disc 15 of one of the above-mentioned substrate materials having the same or a similar crystalline lattice structure. Spacer rings 16 of quartz serve for maintaining the above-mentioned distance between the individual discs. Schematically indicated at 17 is the indium antimonide buffer material which however may be located on the stopper.

The top of the reaction vessel is provided with a hook by means of which the vessel may be suspended into the cylindrical opening of a tubular furnace to be heated in the above-described manner.

The following example relates to the production of epitaxial layers of indium antimonide upon substrates consisting of monocrystalline indium antimonide, with the aid of a reaction vessel designed and prepared as described above with reference to the drawing.

Two circular discs of indium antimonide to serve as sources and two discs of indium antimonide to serve as substrates are alternately stacked in the subsequently sealed reaction vessel so as to form two transport-reaction chambers. The axial distance between the two discs adjacent to each chamber is 0.2 mm. A weighed amount of 0.15 mg./cm.³ iodine is placed into the vessel. Coarsely granular indium antimonide is used as buffer material, the grain size and quantity not being essential as long as sufficient iodine remains available during the period of time in which the vessel is heated to stable-state conditions. After preparing the vessel, it is heated in the above-described manner to show a temperature drop along the reaction vessel of 10° C./cm. This temperature drop is obtained by slowly heating the reaction vessel in the electric resistance furnace in such manner that the temperature at the upper end of the stack is adjusted to 460° C. whereas the temperature at the lower end of the reaction vessel is at 500° C. These temperature conditions are maintained for a period of time depending upon the desired thickness of the epitaxial layer being formed, a processing time of 2 hours being sufficient for most purposes.

I claim:

1. The process of producing monocrystalline layers of indium antimonide on substrates having a compatible crystalline lattice structure, which comprises stacking in a reaction vessel a number of indium antimonide plates and a number of substrate plates and forming interspacial chambers of 0.1 to 2 mm. width between said plates, each chamber being bordered by a substrate plate and by an indium antimonide plate to serve as a source; providing the vessel with halogen and placing granular indium antimonide into the vessel but outside of the stack of plates for subsequently producing a transport-reaction gas whose composition is preserved by the presence of the granular antimonide; heating the vessel to a transport-reaction temperature decreasing 5 to 20° per cm. from one axial end of the stack to the other, each of the antimonide source plates being at a higher temperature than the substrate plate adjacent to the same chamber, whereby the substrate plates are coated with indium antimonide precipitating in the chamber from gaseous halogenides of indium and antimony.

2. The process according to claim 1, wherein said substrate plates consist of indium antimonide.

3. The process according to claim 1, wherein said substrate plates consist of aluminum antimonide.

4. The process according to claim 1, wherein said substrate plates consist of cadmium telluride.

5. The process according to claim 1, wherein said substrate plates consist of barium fluoride.

6. The process according to claim 1, wherein said halogen is iodine.

7. The process according to claim 1, wherein said halogen is iodine and has a concentration of not more than 0.6 mg./cm.³.

8. The process of producing monocrystalline layers of indium antimonide on substrate bodies having a compatible crystalline lattice structure, which comprises stacking indium antimonide plates and substrate plates in a reaction vessel and forming interspacial chambers of 0.1 to 2 mm. width between said plates, each chamber being bordered by a substrate plate and by an indium antimonide plate to serve as a source; providing the vessel with halogen and placing granular indium antimonide into the vessel but outside of the stack of plates for subsequently producing a halogen transport-reaction gas whose composition is preserved by the presence of the granular antimonide; heating the vessel to a temperature between about 400 and about 520° C. with a temperature gradient of 5 to 20° C. per cm. axially along the stack of plates, each of the antimonide source plates being at a higher temperature than the substrate plate adjacent to the same chamber, whereby the substrate plates are coated with indium antimonide precipitating in the chamber from gaseous halogenides of indium and antimony.

9. The process according to claim 1, which comprises also providing the vessel with a reducing gaseous atmosphere.

10. The process according to claim 1, which comprises also providing the vessel with a hydrogen-atmosphere.

References Cited

UNITED STATES PATENTS

| | | | |
|---|---|---|---|
| 3,101,280 | 8/1963 | Harrison et al. | 117—106 X |
| 3,140,965 | 7/1964 | Reuschel | 148—175 |
| 3,140,966 | 7/1964 | Wartenberg | 148—175 |
| 3,152,933 | 10/1964 | Reuschel | 148—175 |
| 3,172,778 | 3/1965 | Gunther et al. | 117—106 X |
| 3,218,205 | 11/1965 | Ruehswein | 117—106 X |
| 3,224,913 | 12/1965 | Ruehswein | 23—104 |

ALFRED L. LEAVITT, *Primary Examiner.*

A. GOLIAN, *Assistant Examiner.*